US006951608B2

United States Patent
Desjoyaux et al.

(10) Patent No.: US 6,951,608 B2
(45) Date of Patent: Oct. 4, 2005

(54) COMPACT FILTERING UNIT FOR A SWIMMING POOL BASIN

(75) Inventors: Jean-Louis Desjoyaux, Chalain le Comtal (FR); Pierre-louis Desjoyaux, La Fouillouse (FR); Catherine Jandros, L'Etrat (FR)

(73) Assignee: Piscines Desjoyaux S.A., La Fouillouse (FR)

( * ) Notice: Subject to any disclaimer, the term of this patent is extended or adjusted under 35 U.S.C. 154(b) by 43 days.

(21) Appl. No.: 11/001,390

(22) Filed: Dec. 1, 2004

(65) Prior Publication Data

US 2005/0092668 A1 May 5, 2005

Related U.S. Application Data

(63) Continuation of application No. PCT/FR03/01469, filed on May 15, 2003.

(30) Foreign Application Priority Data

Jun. 5, 2002 (FR) .................................. 02 07043

(51) Int. Cl.[7] ........................... E04H 4/16; B01D 35/30
(52) U.S. Cl. .................. 210/169; 210/232; 210/416.2; 210/448
(58) Field of Search .............................. 210/169, 232, 210/416.1, 416, 2, 448

(56) References Cited

U.S. PATENT DOCUMENTS

| 3,628,664 A | * | 12/1971 | Stanwood .................... 210/169 |
| 5,178,523 A | | 1/1993 | Cheng-Chung .......... 417/423.3 |
| 5,202,020 A | | 4/1993 | Desjoyaux et al. ......... 210/169 |
| 5,649,514 A | | 7/1997 | Okada et al. ................ 123/514 |
| 6,387,252 B1 | | 5/2002 | Desjoyaux et al. ......... 210/169 |
| 2003/0024862 A1 | * | 2/2003 | Gal ............................ 210/121 |
| 2004/0256300 A1 | * | 12/2004 | Braun et al. ................ 210/169 |

* cited by examiner

Primary Examiner—Fred G. Prince
(74) Attorney, Agent, or Firm—Heslin Rothenberg Farley & Mesiti P.C.

(57) ABSTRACT

This unit includes:
  at least one receptacle formed to extend directly from the bottom of a filtration compartment, delimiting a peripheral space in which a pipeline is formed.
  Two spacer webs link the receptacle to the interior of the compartment over the entire height of the said receptacle, thus delimiting the pipeline.
  The bottom has an opening for communication with the pipeline and an
  upper end of the pipeline fits onto a connector to a suction intake of a pump.

10 Claims, 5 Drawing Sheets

Figure 1:
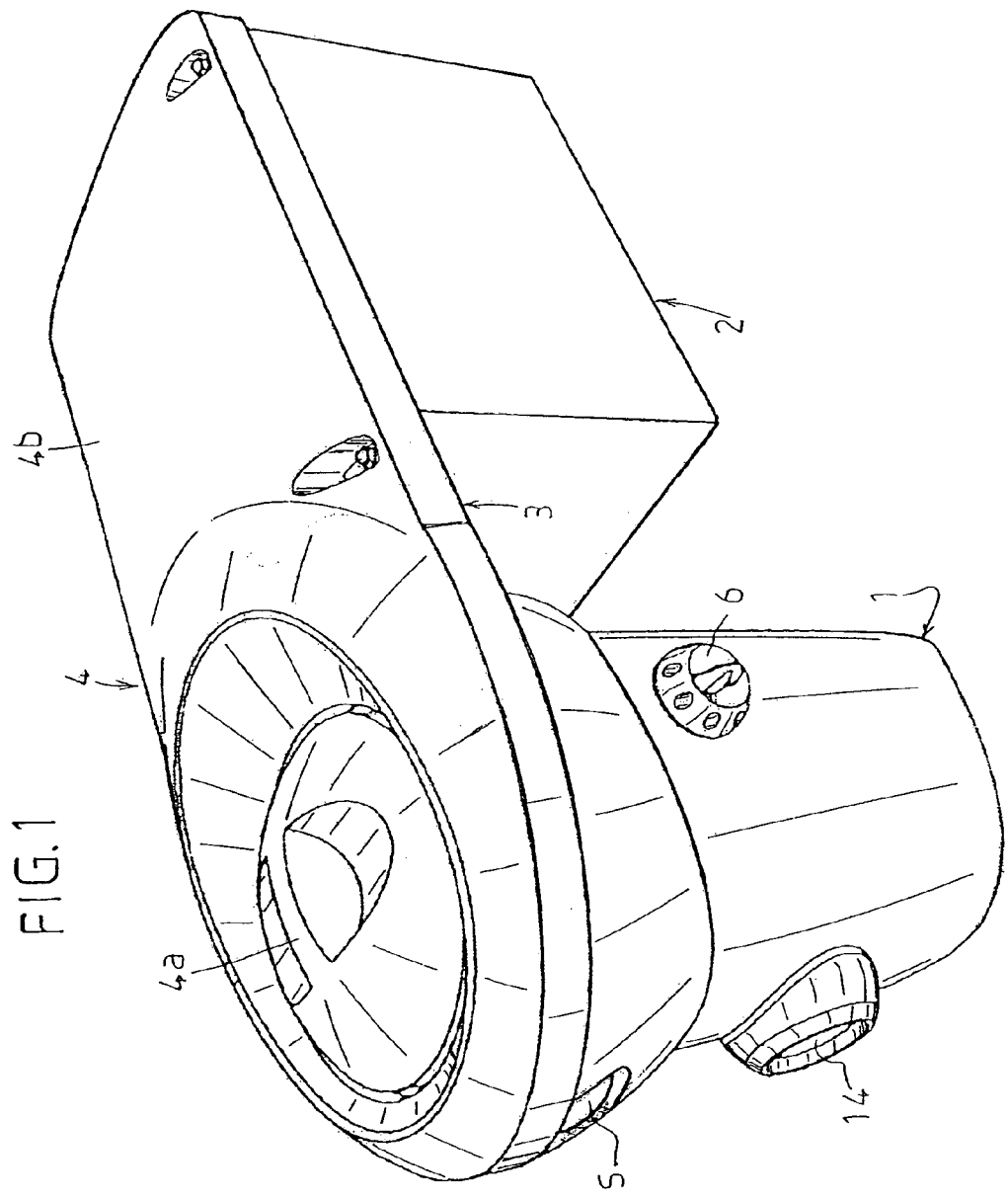

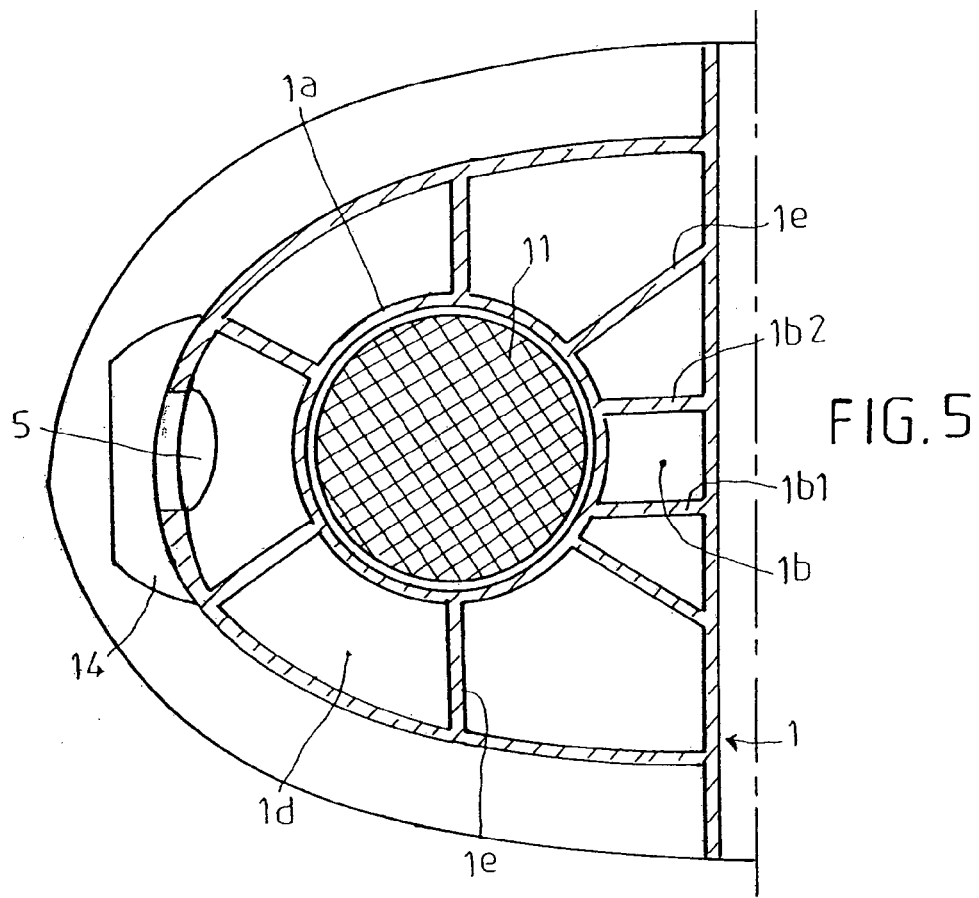
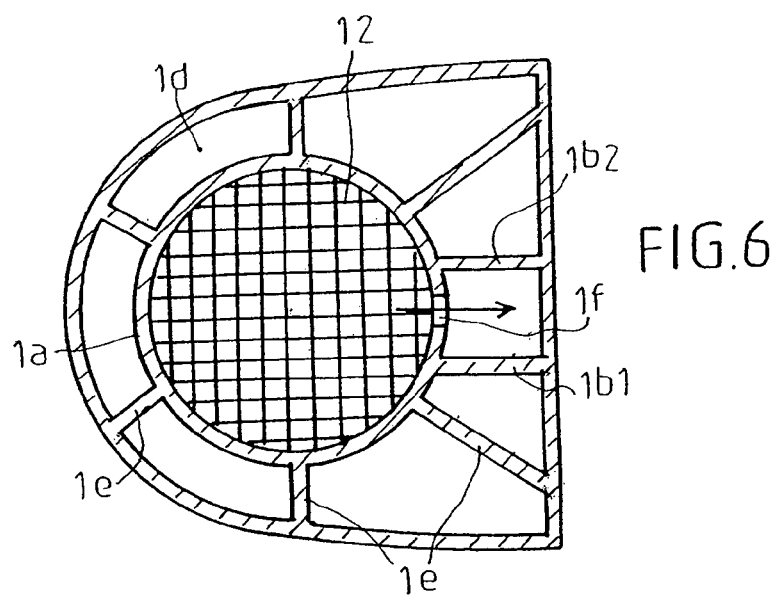

COMPACT FILTERING UNIT FOR A SWIMMING POOL BASIN

CROSS-REFERENCE TO RELATED APPLICATIONS

This application is a continuation of International Application PCT/FR03/01469 filed on May 15, 2003 and published in French as International Publication WO 03/103799 A1 on Dec. 18, 2003, and claims priority from French patent application No. 02.07043 filed Jun. 5, 2002, the entire contents of these applications being incorporated herein by reference.

The invention relates to the technical field of water filtration for swimming pools.

Generally, the filtration is obtained by means of one or more filters which can be of various structures, the filters being fitted in combination with a water-suction and water-delivery circuit.

Different solutions have been proposed to safeguard this function. More particularly, the invention relates to a compact unit comprising a filtration compartment in communication with the pool water and a pumping compartment situated outside the said pool.

In a perfectly known manner, this unit constitutes a compact block fitted, for example, overlapping the panels or other constituent parts of the swimming pool wall. The water originating from the pool is sucked through at least one mouth, known as a SKIMMER, belonging to the filtration compartment submerged in the water. The water which is thus sucked up passes through a filtration member and is delivered into the swimming pool through frontal and/or lateral nozzles by means, generally, of a pump installed in the other compartment situated outside the pool.

The filtration means can especially be constituted by a filter bag fitted detachably in a bowl or well constituted by a cylindrical sleeve mounted vertically in the compartment submerged in the water.

This solution follows, for example, from the teaching of patent FR EP 0423043. The bottom of the cylinder is coupled up with a suction strainer of at least one pump situated in the external compartment. The communication between the bottom of the cylinder, beneath the filter bag, and the suction intake of the pump is effected by means of a pipeline, as follows, for example, from the teaching of patent FR 2799485.

The connection of this suction pipeline with the bottom of the cylinder is relatively difficult to effect. It is necessary to provide for a specific arrangement of the bottom of the filtration compartment, requiring the installation of a sealing joint. Moreover, the cylindrical well must have bracing webs in view of the depression forces exerted by the water, whilst the filtration compartment must have means capable of ensuring the centring and maintenance of the said well.

From this prior art, the problem which the invention sets out to resolve is to simplify and rationalize the production of the block unit, especially at the filtration compartment level, by eliminating, in particular, the use of a separate cylindrical well receiving the filtration member, thereby eliminating the drawback resulting from the linkage of the cylindrical pit with the suction pipeline.

In order to resolve such a problem, a compact filtration unit has been devised and perfected that receives at least one filtration member and a compartment situated on the outside of the swimming pool and that receives at least one pump, which compartment is submerged in the water and has a mouth known as a skimmer for suction of the water by the pump through the filtration member and through the front and/or side nozzles for return of the filtered water to the swimming pool.

According to the invention:
  at least one receptacle is formed to extend directly from the bottom of the filtration compartment, delimiting a peripheral space in which a pipeline is formed;
  two spacer webs link the receptacle to the interior of the compartment over the entire height of the said receptacle, thus delimiting the pipeline;
  the bottom has an opening (1*f*) for communication with the pipeline;
  the upper end of the pipeline fits onto means of connection to a suction intake of the pump.

These features mean that the bottom of the receptacle holding the filtration member no longer has to be connected to a separate pipeline.

In order to resolve the posed problem of the connection of the receptacle with the suction intake, the connecting means for the pipeline are constituted by a fit-in cover jointed to the upper part of the said pipeline, the said cover having a connecting sleeve capable of receiving a pipe element coupled to a suction intake belonging to at least one pump mounted in the pumping compartment.

In order to resolve the posed problem of allowing for the pressures exerted by the water, the receptacle is linked to the interior of the compartment by vertical bracing webs.

Advantageously, the receptacle has, above the communication opening with the suction pipeline, a pre-filtration element in the form of a screen.

According to an advantageous realization, the receptacle is constituted by a cylindrical body formed directly from the bottom of the filtration compartment, delimiting a peripheral space in which the bracing webs and the suction pipeline are formed. The filtration means is constituted by a filter bag disposed inside the receptacle and fixed, removably, at the level of the opening of the said receptacle.

In view of the fundamental characteristics of the invention, in a preferred embodiment the filtration and pumping compartments are linked by an element serving as a frame, so as to be situated on either side of the considered wall of the swimming pool, the filtration compartment being submerged in the water, while the pumping compartment is buried in the ground.

The frame has fittings for the passage of the suction and delivery pipes between the two pumping and filtration compartments.

The frame receives a cover, in two parts, in order to gain separate access to each of the filtration and pumping compartments.

In view of the posed problem of significantly reducing the production costs, each compartment is obtained by injection of a plastics material.

Figure 2:
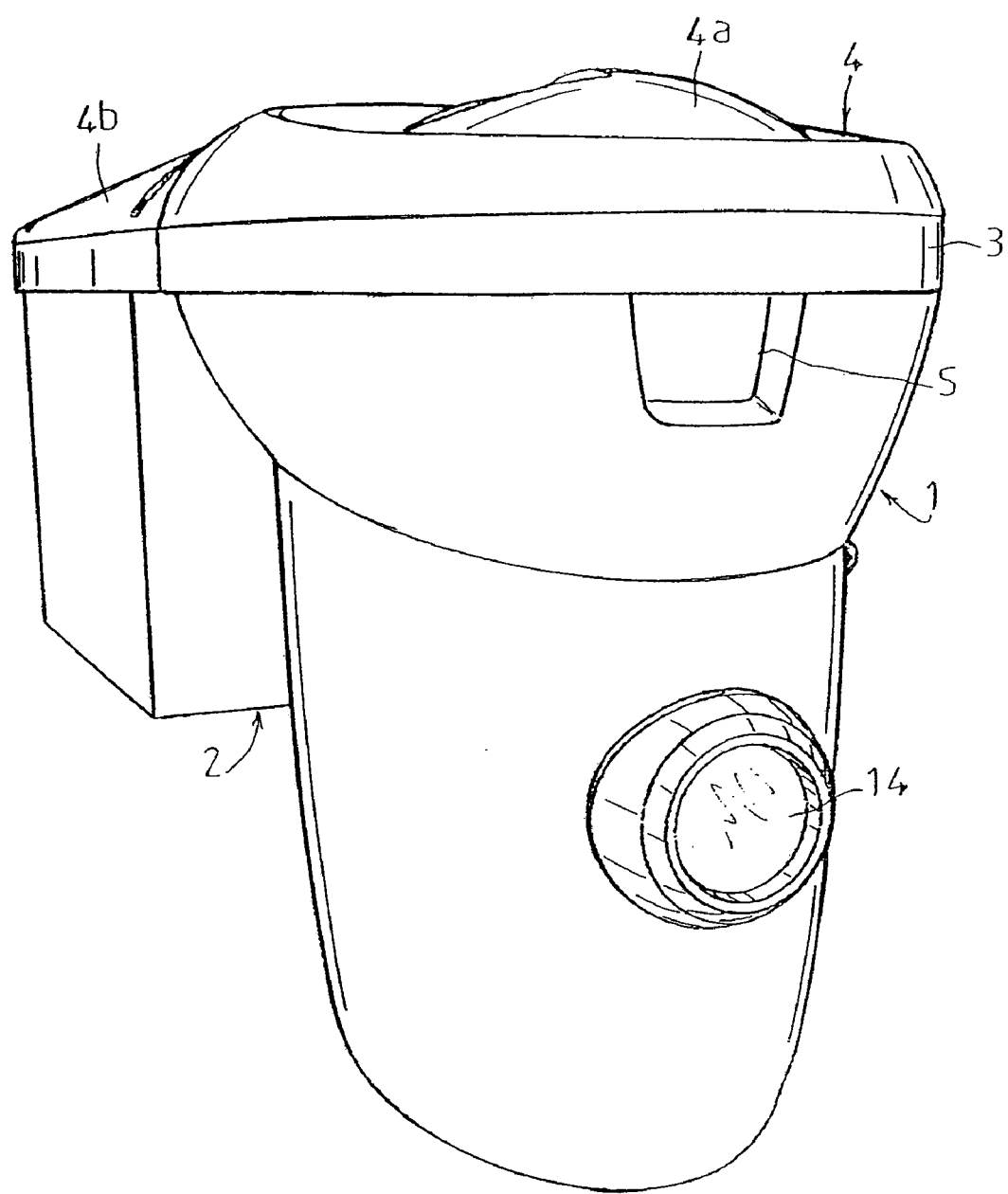
Figure 3:
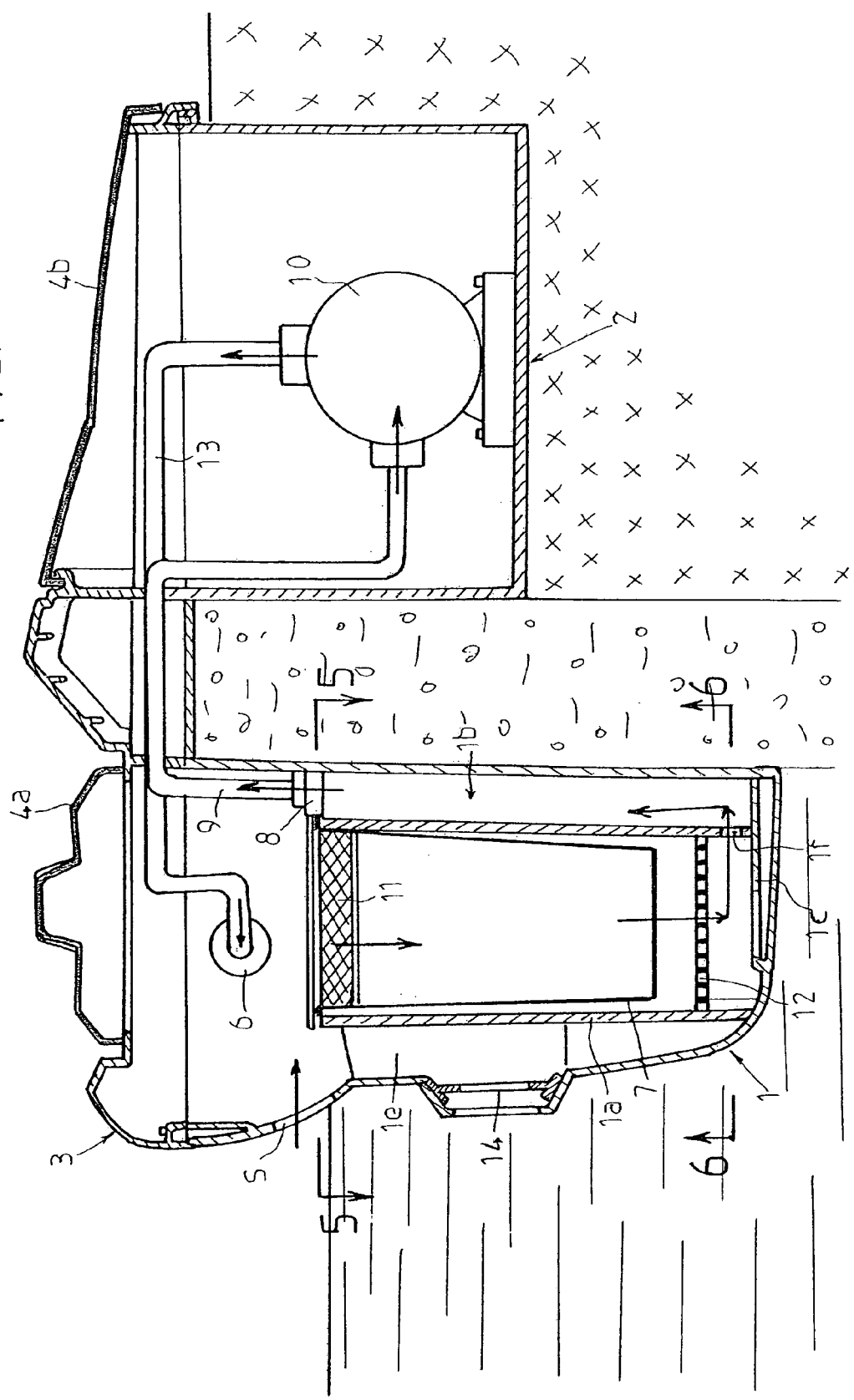
Figure 4:
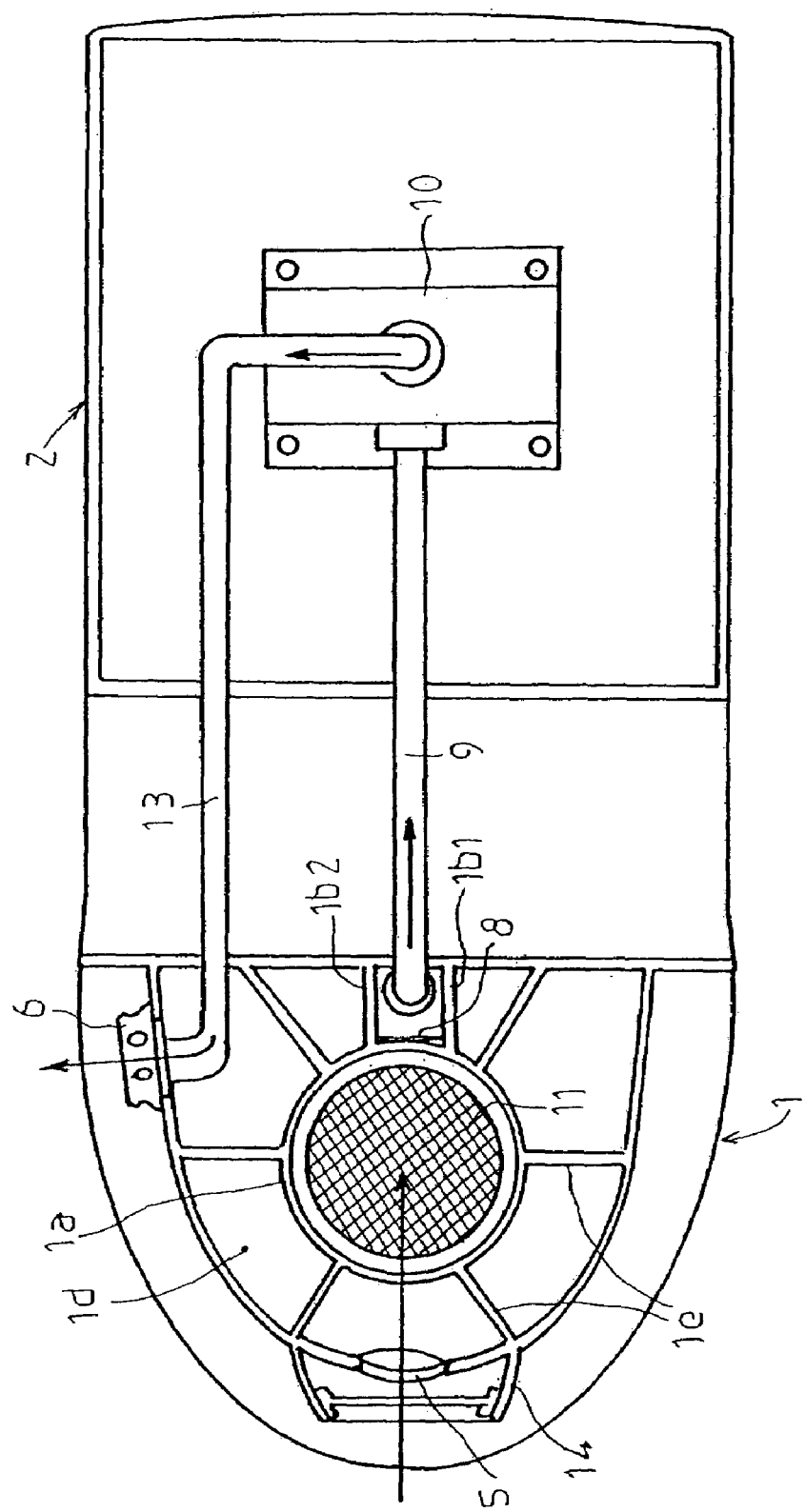

The invention is described in greater detail with reference to the figures of the appended drawings, in which:

FIGS. 1 and 2 are perspective views of a non-limiting embodiment of the compact filtration block according to the characteristics of the invention, FIG. 3 is a view in longitudinal section of the block unit, FIG. 4 is a top view corresponding to FIG. 3, the cover of the filtration compartment being removed, FIGS. 5 and 6 are cross-sectional views, viewed respectively along the lines 5—5 and 6—6 of FIG. 3.

As illustrated, FIGS. 1 and 2 show an indicative and in no way limiting example of the compact filtration unit for a swimming pool. This unit comprises a compartment (1) submerged in the water and receiving a filtration means. In the remainder of the description, this compartment (1) is referred to as the filtration compartment. The compact unit contains another compartment (2) situated outside the swimming pool, receiving a pumping means. In the remainder of the description, this compartment (2) is referred to as the pumping compartment.

In a preferred embodiment and in view of the method of production of the filtration compartment (1), the two compartments (1) and (2) are mutually independent and are linked by an element (3) serving as a frame so as to be situated on either side of the considered wall of the swimming pool. The frame (3) receives a cover (4), in two parts (4a) and (4b), in order to gain separate access to the pumping compartment (2) and to the filtration compartment (1).

In a known manner, the filtration compartment (1) submerged in the water has at least one suction mouth or <<SKIMMER>> (5), and at least one delivery nozzle (6) disposed laterally or facially.

According to a fundamental characteristic of the invention, the filtration compartment (1) has directly, from its production, at least one receptacle (1a) capable of receiving a filtration means (7), for example in the form of a filter bag. The receptacle (1a) is situated beneath the suction mouth (5) to receive the water originating from the swimming pool, by suction, as will be indicated in the remainder of the description. To this end, the receptacle (1a) is in communication, at its base, with fittings (1b) formed directly in the production of the filtration compartment (1) and capable of serving as a pipeline. The pipeline (1b) thus formed cooperates with connecting means (8) to the pumping compartment in order to suck the water through the filtration means (7).

The pipeline (1b) is formed by two webs (1b1) (1b2) linking the receptacle (1) and the interior of the filtration compartment (1) over the full height of the said receptacle (1a). The receptacle (1a) is constituted by a cylindrical body formed directly from the bottom (1c) of the filtration compartment (1), delimiting a peripheral space (id) in which bracing webs (1e) and the pipeline (1b) are formed.

The base of the cylindrical body (1a) has a communication opening (1f) with the pipeline (1b). The upper end of the pipeline (1b) cooperates with the connecting means (8) in the form of a cover mounted in a leak-tight manner on the end of the said pipeline (1b). The cover (8) has a connecting sleeve capable of receiving, in a leak-tight manner, a pipeline (9) coupled to the suction intake of the pumping means in the form of at least one pump (10).

In view of these measures, the result is that the filtration compartment therefore has directly, from its production, the necessary internal fittings allowing the reception of the filtration means (7), whereby the installation of connecting pipelines is eliminated.

The filtration means are advantageously constituted by a filter bag (7) disposed inside the cylinder (1a) and fixed removably, by any known and appropriate means, at the level of the opening of the said cylinder. Following installation of the filter bag (7), the latter can receive in a known manner a pre-filtration element (11). It should be noted that the cylinder (1a) can have above the opening (1e) a pre-filtration element in the form of a screen (12).

In view of the fundamental characteristics of the invention, each of the constituent elements of the block is obtained by a process of injection of a plastics material. This is especially the case with the filtration compartment (1), having, directly from the injection, the cylinder (1a) and the pipeline (1b). The pumping compartment (2), the connecting frame (3) and the covers (4a) and (4b) can likewise be obtained by the injection process.

Obviously, the pump (10) is linked by a pipeline (13) to the delivery nozzle (6). The connecting frame (3) of the filtration compartment (1a) and of the pumping compartment (2) has all types of appropriate fittings for the passage of the suction (9) and delivery (13) pipes between the two compartments (1) and (2).

The working of the compact block filtration unit remains traditional. Following start-up of the pump(s) (10), the swimming pool water which enters through the SKIMMER (5) is sucked through the filter bag (7) by the pipeline (1b) connected at (8) to the pipeline (9). The water thus filtered is delivered by the pipeline (13) through the nozzle(s) (6).

Obviously, the filtration compartment (1) has all types of outer fittings, of the floodlights (14), stair steps . . . type.

The advantages follow clearly from the invention, namely, by way of emphasis and reminder, the possibility of obtaining in a single operation the filtration compartment having internally all the necessary fittings allowing the installation of filtration members per se, whilst allowing a connection in the top part of the suction pipeline.

What is claimed is:

1. Compact unit for filtering water of a swimming pool, the unit comprising a filtration compartment that receives at least one filtration member and a pumping compartment situated on an outside of the swimming pool and that receives at least one pump, wherein said filtration compartment is submerged in the water and has a mouth known as a skimmer for suction of the water by the pump through the filtration member and through front and/or side nozzles for return of the filtered water to the swimming pool, and wherein:

at least one receptacle is formed to extend directly from a bottom of the filtration compartment, delimiting a peripheral space in which a pipeline is formed;

two spacer webs link the receptacle to an interior of the compartment over an entire height of the said receptacle, thus delimiting the pipeline;

the bottom has an opening for communication with the pipeline; and an upper end of the pipeline fits onto means of connection to a suction intake of the pump.

2. Compact filtration unit according to claim 1, wherein the means of connection comprises a fit-in cover jointed to the upper end of the said pipeline, the said cover having a connecting sleeve capable of receiving a pipe element coupled to the suction intake of the pump.

3. Compact filtration unit according to claim 1, wherein the receptacle is linked to the interior of the filtration compartment by bracing webs.

4. Compact filtration unit according to claim 3, wherein the receptacle is constituted by a cylindrical body formed directly from the bottom of the filtration compartment, delimiting the peripheral space in which the bracing webs and the pipeline are formed.

5. Compact filtration unit according to claim 1, wherein the receptacle has, above a communication opening with the suction pipeline, a pre-filtration element in the form of a screen.

6. Compact filtration unit according to claim 1, wherein each of the at least one filtration member comprises a filter bag disposed inside the receptacle and fixed, removably, at the level of the opening of the said receptacle.

7. Compact filtration unit according to claim 1, wherein the filtration and pumping compartments are linked by a frame, so as to be situated on either side of a wall of the swimming pool, the filtration compartment being submerged in the water, whilst the pumping compartment is buried in the ground.

8. Compact filtration unit according to claim 7, wherein the frame has fittings for passage of suction and delivery pipes between the pumping and filtration compartments.

9. Compact filtration unit according to claim 7, wherein the frame receives a cover, in two parts, in order to gain separate access to each of the filtration and pumping compartments.

10. Compact filtration unit according to claim 1, wherein each compartment is obtained by injection of a plastics material.

* * * * *